(12) United States Patent
Ko et al.

(10) Patent No.: US 12,583,412 B2
(45) Date of Patent: Mar. 24, 2026

(54) AIR BAG DEVICE

(71) Applicant: HYUNDAI MOBIS CO., LTD., Seoul (KR)

(72) Inventors: Byeong Mann Ko, Yongin-si (KR); Sang Won Hwangbo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/202,145

(22) Filed: May 8, 2025

(65) Prior Publication Data

US 2025/0368158 A1 Dec. 4, 2025

(30) Foreign Application Priority Data

May 31, 2024 (KR) ........................ 10-2024-0071524

(51) Int. Cl.
B60R 21/2338 (2011.01)
B60R 21/207 (2006.01)
B60R 21/231 (2011.01)

(52) U.S. Cl.
CPC ........ B60R 21/2338 (2013.01); B60R 21/207 (2013.01); *B60R 2021/23146* (2013.01); *B60R 2021/23386* (2013.01)

(58) Field of Classification Search
CPC .............. B60R 21/2338; B60R 21/207; B60R 2021/23386; B60R 21/231; B60R 2021/23146
See application file for complete search history.

(56) References Cited

U.S. PATENT DOCUMENTS

| | | | | |
|---|---|---|---|---|
| 9,994,181 | B1 * | 6/2018 | Dubaisi | ................. B60R 21/207 |
| 10,556,563 | B2 * | 2/2020 | Song | ................... B60R 21/2338 |
| 10,870,405 | B2 * | 12/2020 | Kwon | ................... B60R 21/207 |
| 10,960,841 | B2 * | 3/2021 | Deng | ................. B60R 21/2338 |
| 11,560,114 | B2 * | 1/2023 | Lee | ...................... B60R 21/207 |
| 11,584,329 | B2 * | 2/2023 | Sung | .................... B60R 21/207 |
| 11,584,330 | B2 * | 2/2023 | Lee | ................... B60R 21/2165 |
| 11,618,403 | B2 * | 4/2023 | Kang | ................. B60R 21/2338 |
| | | | | 280/730.1 |

(Continued)

FOREIGN PATENT DOCUMENTS

| | | | | |
|---|---|---|---|---|
| DE | 10 2022 104 440 A1 | 8/2023 | | |
| KR | 20210145364 A | * 12/2021 | ........... B60R 21/233 |

(Continued)

OTHER PUBLICATIONS

KR-20210145364-A (machine translation) (Year: 2021).*

(Continued)

*Primary Examiner* — Jason D Shanske
*Assistant Examiner* — Joselynn Y Sliteris
(74) *Attorney, Agent, or Firm* — NSIP Law

(57) ABSTRACT

An airbag device and an airbag system for a vehicle are provided. The airbag device includes an airbag cushion deployed to cover a side surface and a front surface of a seat, a restraint tether connected to the airbag cushion at a position passing a body part of a passenger between an inner surface of the airbag cushion and a seatback, and a tether wire connected from a front portion of the airbag cushion through an outside space of the airbag cushion to the restraint tether so that the restraint tether is pulled in a direction opposite to the passenger by a deployment force of the airbag cushion.

14 Claims, 4 Drawing Sheets

(56)  References Cited

U.S. PATENT DOCUMENTS

| | | | |
|---|---|---|---|
| 11,618,407 B2 * | 4/2023 | Hwangbo ............. | B60R 21/237 |
| | | | 280/730.1 |
| 11,685,331 B2 * | 6/2023 | Lee ....................... | B60R 21/207 |
| | | | 280/730.2 |
| 11,702,028 B2 * | 7/2023 | Lee ....................... | B60R 21/261 |
| | | | 280/730.1 |
| 11,851,018 B2 * | 12/2023 | Sung .................... | B60R 21/239 |
| 11,851,019 B2 * | 12/2023 | Sung .................... | B60R 21/239 |
| 12,012,064 B2 * | 6/2024 | Smitterberg ........ | B60R 21/2338 |
| 12,263,802 B2 * | 4/2025 | Weimer .............. | B60R 21/2338 |
| 12,296,775 B2 * | 5/2025 | Hwangbo ............. | B60R 21/207 |
| 12,409,803 B2 * | 9/2025 | Weimer .............. | B60R 21/2338 |
| 12,434,656 B2 * | 10/2025 | Leforestier ........... | B60R 21/261 |
| 2022/0388472 A1 | 12/2022 | Hwangbo et al. | |

FOREIGN PATENT DOCUMENTS

| | | | |
|---|---|---|---|
| KR | 10-2022-0164314 A | 12/2022 | |
| WO | WO-2022008403 A1 * | 1/2022 | ....... B60R 21/23138 |

OTHER PUBLICATIONS

WO-2022008403-A1 (machine translation) (Year: 2022).*

Korean Office Action Issued on Sep. 18, 2025, in Counterpart Korean Patent Application No. 10-2024-0071524 (4 Pages in English, 4 Pages in Korean).

Extended European Search Report issued on Dec. 1, 2025, in counterpart European Patent Application No. 25176875.0 (10 pages in English).

* cited by examiner

FIG. 3

AIR BAG DEVICE

CROSS-REFERENCE TO RELATED APPLICATION

The present application claims priority to and the benefit under 35 USC § 119(a) of Korean Patent Application No. 10-2024-0071524, filed on May 31, 2024, in the Korean Intellectual Property Office, the entire contents of which are incorporated herein for all purposes by this reference.

BACKGROUND

1. Field

The present disclosure relates to an airbag device configured to prevent a tether that is unfolded between an omnidirectional airbag and a passenger seat from being brought into contact with a body part of a passenger.

2. Description of the Related Art

An omnidirectional airbag, which is deployed in a form that covers a side part and a front part of the passenger, has an airbag cushion having a frontal chamber and a side chamber connected to each other.

The airbag cushion is folded on the left and right surfaces of a seat. The airbag cushion is deployed toward the front space of a passenger in the event of a vehicle collision and then encloses the passenger's side and front to protect the passenger.

However, when the side chamber and the front chamber are rotated outward in the deployment process of the airbag cushion and opened excessively, there is a gap in front of the passenger, making it difficult to restrain the passenger safely.

Accordingly, as a tether connects the front chamber and/or the side chamber and the seat to each other, the front chamber is restricted from being rotated outward by the tether, controlling the deployment form of the airbag cushion.

However, in the process of unfolding the tether with the airbag cushion, there is a possibility that the tether may be brought into contact with a passenger's body part, causing injury to the passenger.

The description provided above as a related art of the present disclosure is just to help understand the background of the present disclosure and should not be construed as being included in the related art known by those skilled in the art.

SUMMARY

The present disclosure is proposed to solve the above problem, an objective of the present disclosure is to provide an airbag device configured to prevent a tether that is unfolded between an omnidirectional airbag and a seat from being brought into contact with a passenger's body part.

The technical problems to be achieved in the present disclosure are not limited to the above technical problem, and other problems not mentioned will be clearly understood by those skilled in the art from the description below.

In a general aspect of the disclosure, an airbag device includes: an airbag cushion deployed to cover a side surface and a front surface of a seat; a restraint tether connected to the airbag cushion at a position passing a body part of a passenger between an inner surface of the airbag cushion and a seatback; and a tether wire connected from a front portion of the airbag cushion through an outside space of the airbag cushion to the restraint tether so that the restraint tether is pulled in a direction opposite to the passenger by a deployment force of the airbag cushion.

The tether wire may be connected to a portion of the restraint tether closest to the body part of the passenger.

The restraint tether may be connected to a position that passes a shoulder part of the passenger, and the tether wire is connected to a portion of the restraint tether closest to a neck portion of the passenger.

The tether wire, connected to an inner surface of a front end of the airbag cushion at a first end thereof, may extend rearward inside the airbag cushion to exit the airbag cushion, wherein the tether wire is connected to the restraint tether at a second end thereof.

The airbag cushion may include: a side chamber deployed to cover the side surface of the seat; and a front chamber deployed to cover the front surface of the seat, wherein the first end of the tether wire may be fixed to an inner surface of the front chamber.

The airbag cushion may include a partition wall having a through hole extending through the inner surface of the airbag cushion, wherein the tether wire may pass through the through hole and then extend rearward.

An insertion hole may be formed at a rear end of the airbag cushion, wherein the tether wire may come out the airbag cushion through the insertion hole.

The second end of the tether wire may be connected to the restraint tether from a direction of the side chamber.

The tether wire coming out of the airbag cushion may extend upward along the side chamber and, at a height where the restraint tether is located, may extend toward and is connected to the restraint tether.

In another general aspect of the disclosure, an airbag system for a vehicle, includes: an airbag cushion configured to, upon deployment, inflate a left side chamber including a left front portion, and a right side chamber including a right front portion, such that the left side chamber and the right side chamber protect respective sides of a passenger seated on a seat of the vehicle, and the left front portion and the right front portion protect a front of the passenger; a restraint tether connected to a seatback of the seat and configured to, upon deployment of the airbag cushion, maintain the left front chamber and the right front chamber in a position to restrain forward movement of the occupant; and a tether wire connected to at least one of the left front portion and the right front portion through the airbag cushion to the restraint tether, such that the restraint tether is pulled in a direction opposite to the passenger by a deployment force of the airbag cushion and does not come in contact with the passenger.

The left side chamber and the right side chamber may include respective partition walls with through holes extending through inner surfaces of the airbag cushion, wherein the tether wire may passe through the through holes to enable the tether wire to extend rearward.

The restraint tether may include an upper restraint tether and a lower restraint tether, wherein the upper restraint tether may be attached to upper surfaces of the left front chamber and the right front chamber, wherein the lower restraint tether may be attached to lower surfaces of the left front chamber and the right front chamber.

The tether wire may be connected to a portion of the restraint tether closest to the body part of the passenger.

The restraint tether may be connected to a position that passes a shoulder part of the passenger, and the tether wire may be connected to a portion of the restraint tether closest to a neck portion of the passenger.

The tether wire, connected to an inner surface of a front end of the airbag cushion at a first end thereof, may extend rearward inside the airbag cushion to exit the airbag cushion, wherein the tether wire may be connected to the restraint tether at a second end thereof.

According to the present disclosure, the tether wire pulls the restraint tether in a direction opposite to the passenger from the time when the restraint tether is brought into contact with the passenger's head, neck, etc., so there is an effect in preventing injury to the passenger, with the restraint tether configured to avoid contact with the passenger's head and neck.

Moreover, in the deployment process of the airbag cushion, the movement of pulling the tether wire secures additional restraint force of the upper restraint tether so that the restraint force of the airbag cushion is increased. Furthermore, to secure the restraint force of the upper restraint tether, the tether wire is only added without an additional device, such as an actuator, etc., so that the cost competitiveness of the airbag device can be increased.

In addition, the tether wire is pulled in conjunction with the deployment operation of the airbag cushion, and therefore, there is no risk of malfunctions in the tether wire under a condition where the airbag is normally operated, the operability of the tether wire can be secured.

The effect of the present disclosure is not limited to the above-mentioned effects, and other effects not mentioned will be clearly understood by those skilled in the art from the description below.

BRIEF DESCRIPTION OF THE DRAWINGS

FIG. 3 is a view showing a lower restraint tether according to the present disclosure.

DETAILED DESCRIPTION

In the following description, if it is decided that the detailed description of known technologies related to the present disclosure makes the subject matter of the embodiment described herein unclear, the detailed description is omitted. Furthermore, the accompanying drawings are provided only for easy understanding of the embodiment disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

Singular forms are intended to include plural forms unless the context clearly indicates otherwise.

It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

The suffixes "module" and "part" for the components used in the following description are given or mixed in consideration of only the ease of writing the specification, and do not have distinct meanings or roles by themselves.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Hereinbelow, the embodiment disclosed herein will be described with reference to accompanying drawings.

An airbag device of the present disclosure includes: an airbag cushion 100 deployed in a form that covers a side surface and a front surface of a seat; a restraint tether 200 connected to a position that passes a body part of a passenger between an inner surface of the airbag cushion 100 and a seatback; and a tether wire 300 connected from a front portion of the airbag cushion 100 through the outside space of the airbag cushion 100 to the restraint tether 200 to pull the restraint tether 200 in a direction opposite to the passenger by a deployment force of the airbag cushion 100 to prevent the restraint tether 200 from being brought into contact with the passenger.

Figure 1:
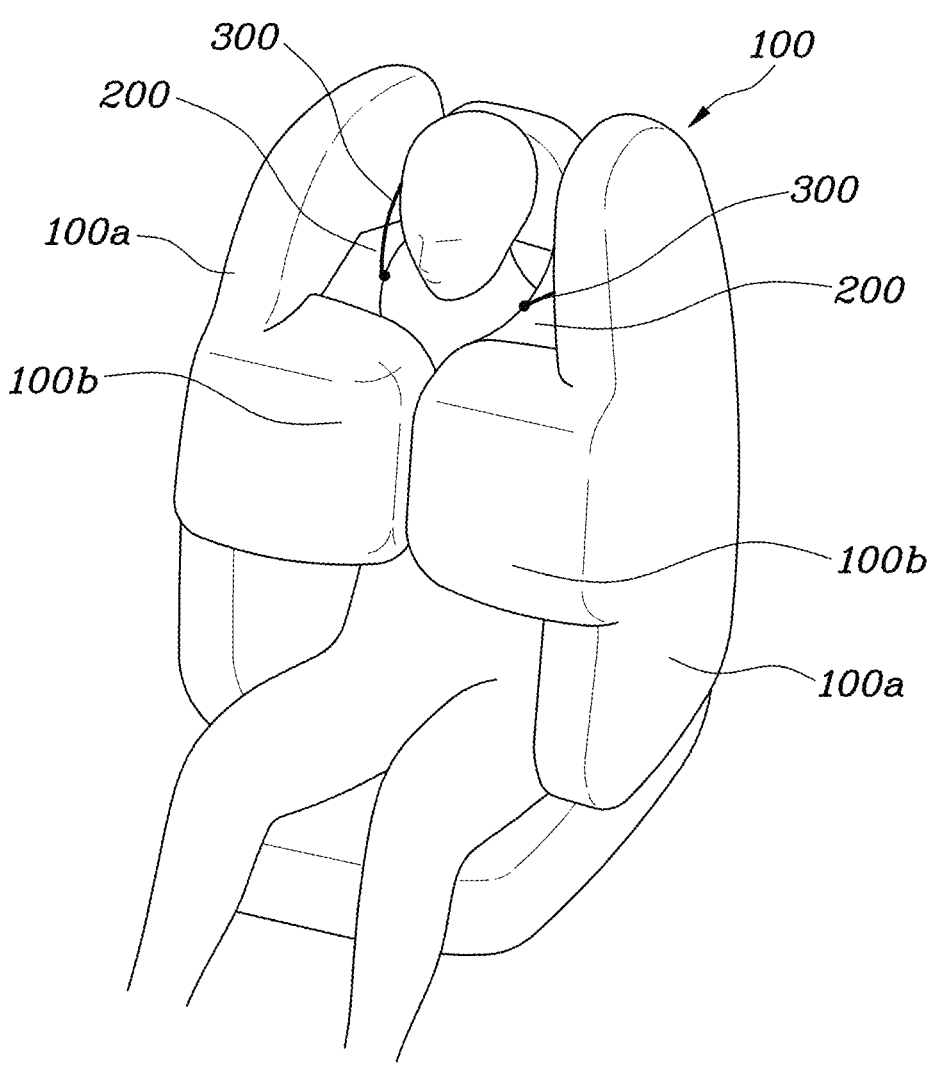
FIG. 1 is a view showing an airbag cushion according to the present disclosure, which is deployed.
Figure 2:
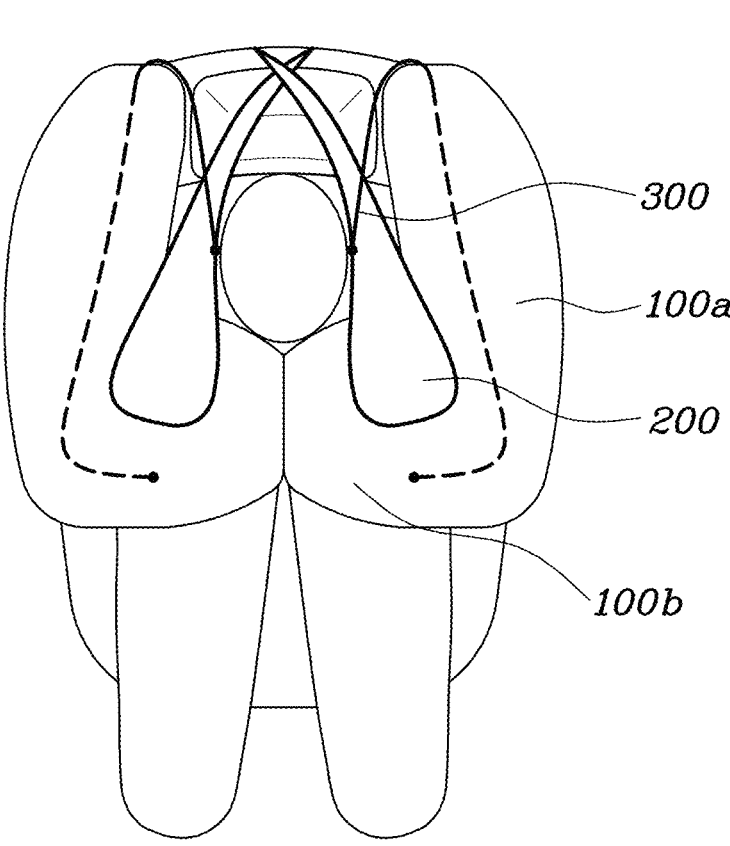
FIG. 2 is a view showing a structure in which a tether wire according to the present disclosure is connected to a restraint tether.

Describing with reference to FIGS. 1 and 2, the airbag cushion 100 includes a side chamber 100*a* deployed in a form that covers the side surface of the seat, and a front chamber 100*b* deployed in a form that covers the front surface of the seat.

The side chamber 100*a* is deployed forward from each of left and right parts of the seatback and deployed long in a vertical longitudinal direction.

The side chamber 100*a* is deployed toward a space between a vehicle structure, such as a door, a center console, etc., and a passenger to protect the passenger's main lateral body parts, such as head, shoulder, chest, abdomen, and pelvis.

The front chamber 100*b* is connected to a front end of each of the left and right side chambers 100*a* and deployed in a form that is bent toward the front space of the passenger.

The front chamber 100*b* is deployed to protect an area from the shoulder of the passenger to the abdomen.

In other words, in the left and right spaces of the seat, the side chamber 100*a* and the front chamber 100*b* are deployed to enclose entirely the both lateral and front surfaces of the passenger.

Therefore, the airbag of the present disclosure directly restrains the passenger with respect to various seat positions and passenger postures, and the airbag can respond to different crash modes to secure the passenger's safety and can replace a seat belt as well as airbags in other positions, significantly improving the productivity of the airbag.

The restraint tether 200 may be an upper restraint tether 200 connected to both an upper portion of the airbag cushion 100 and an upper end of the seatback while being located therebetween.

A front surface and a side surface of the upper restraint tether 200 are respectively fixed, with an upper end of the front chamber 100*b*, to an inner surface of the side chamber 100*a* to which the upper end of the front chamber 100*b* is connected.

Furthermore, the upper restraint tether 200 may pass over a shoulder of the passenger and then be connected to a seatback frame embedded in an upper end of the seatback.

At this point, one upper restraint tether 200 connected to the left upper end of the seatback is connected to an upper portion of the right airbag cushion 100, and another upper restraint tether 200 connected to the right upper end of the seatback is connected to the upper portion of the left airbag cushion 100. Therefore, the left and right upper restraint tethers 200 are arranged to cross around the neck portion of the passenger so that the restraint force of the airbag cushion 100 can be increased. However, this arrangement may cause the upper restraint tether 200 to be brought into contact with the neck of the passenger during the deployment process of the airbag cushion 100, but the tether wire 300 prevents the upper restraint tether 200 from being brought into contact with the neck of the passenger.

Furthermore, the restraint tether may include a lower restraint tether 210 connected to both a lower portion of the airbag cushion 100 and a lower end of the seatback while being located therebetween.

Figure 3:
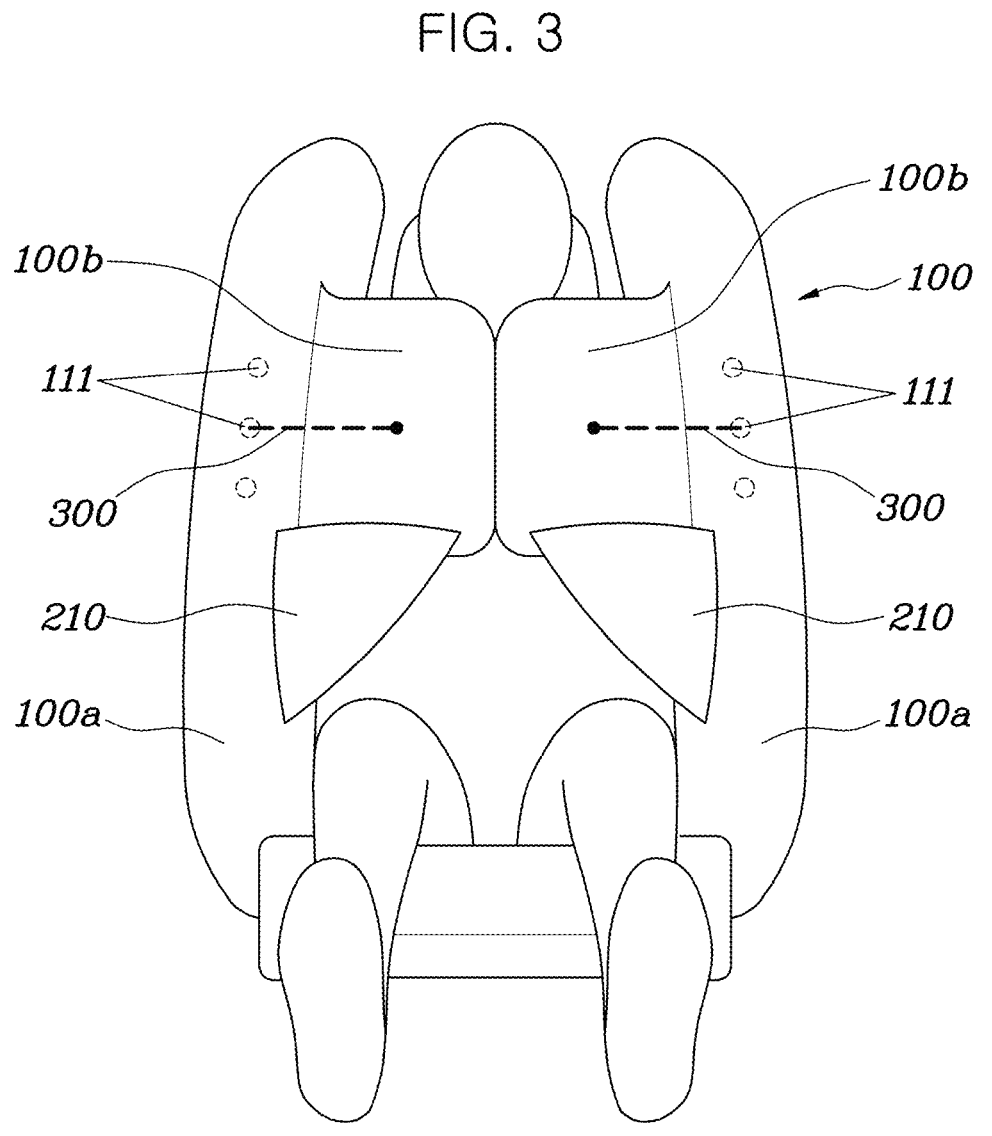

Describing with reference to FIG. 3, a front surface and a side surface of the lower restraint tether 210 are respectively connected, with a lower end of the front chamber 100*b*, to the inner surface of the side chamber 100*a* that extends to the lower end of the front chamber 100*b*.

Furthermore, the lower restraint tether 210 may pass over an upper leg part of the passenger and be connected to a seatback frame embedded in the lower end of the seatback.

According to the present disclosure, it is preferable that the tether wire 300 is connected to the upper restraint tether 200, but may be connected to the lower restraint tether 210 in some cases.

However, hereinbelow, the configuration of the tether wire 300 connected to the upper restraint tether 200 will only be described.

Specifically, as shown in FIGS. 1 and 2, the tether wire 300 of the present disclosure has a form of a cord, such as a string or a strap, and is connected to the outside part of the airbag cushion 100 while being fixed to the front part of the airbag cushion 100 or a portion near the front part.

In addition, the tether wire 300 connected to the outside part of the airbag cushion 100 is connected to a contact point of the upper restraint tether 200 that may be brought into contact with the neck of the passenger.

Thereafter, when the airbag cushion 100 is deployed, due to a deployment pressure of the airbag cushion 100, one end of the tether wire 300 connected to the front part of the airbag cushion 100 is pulled forward, and the upper restraint tether 200 connected to the other end of the tether wire 300 is pulled in a direction away from the passenger.

As described above, the tether wire 300 pulls the upper restraint tether 200 from the time the upper restraint tether 200 is brought into contact with the passenger's head and neck, which allows the upper restraint tether 200 to avoid contact with the passenger's head and neck to prevent an injury risk of the passenger.

Moreover, in the deployment process of the airbag cushion 100, the movement of pulling the tether wire 300 secures additional restraint force of the upper restraint tether 200 so that the restraint force of the airbag cushion 100 is increased. Furthermore, to secure the restraint force of the upper restraint tether 200, the tether wire 300 is only added without an additional device such as an actuator, etc. so that the cost competitiveness of the airbag device can be increased.

In addition, since the tether wire 300 is pulled in conjunction with the deployment operation of the airbag cushion 100, there is no risk of malfunctions of the tether wire 300 in a condition where the airbag is normally operated, and the operability of the tether wire 300 can be secured.

Furthermore, as shown in FIG. 2, the tether wire 300 may be connected to the restraint tether 200 closest to the passenger's body part.

Preferably, the restraint tether 200 may be connected to a position that passes over the passenger's shoulder, and the tether wire 300 may be connected to the restraint tether 200 closest to the neck of the passenger.

In other words, as described above, the tether wire 300 is connected to the upper restraint tether 200 and, specifically within a longitudinal range of the upper restraint tether 200, connected to a portion located closest to the neck of the passenger.

Therefore, since the tether wire 300 pulls the portion of the restraint tether 200 that may be brought in contact with the passenger's head, neck, etc., the airbag cushion 100 is deployed while avoiding contact between the restraint tether 200 and the passenger's head and neck, and the risk of injury to passengers' body parts due to friction with the restraint tether 200 is prevented.

Figure 4:
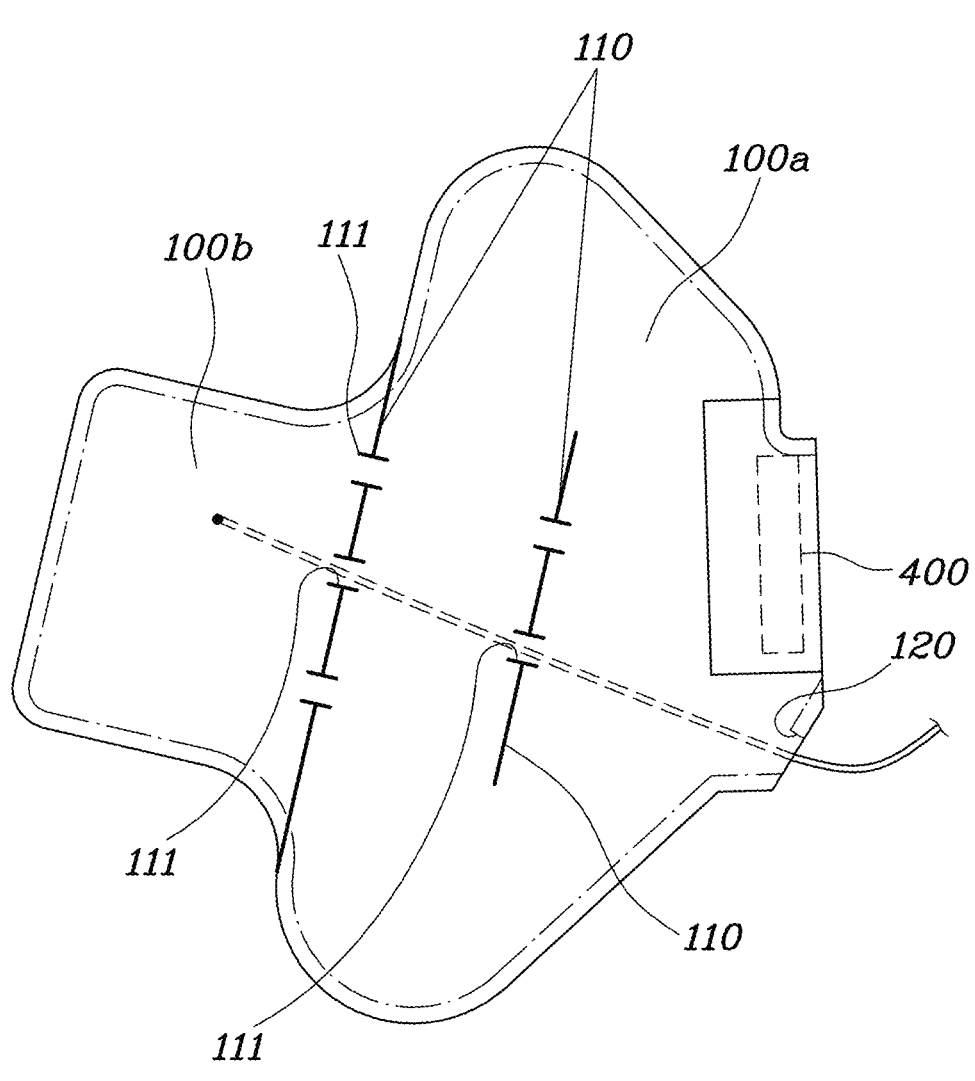
FIG. 4 is a view showing a structure in which the tether wire according to the present disclosure extends from the inside space of the airbag cushion to the outside space.

Meanwhile, as shown in FIGS. 2 and 4, a first end of the tether wire 300 is connected to the inner surface of the front end of the airbag cushion 100, extends rearward inside the airbag cushion 100, and exists out the airbag cushion 100 to be connected to the restraint tether 200 at a second end.

The airbag cushion 100 includes the side chamber 100*a* deployed in a form that covers the side surface of the seat, and the front chamber 100*b* deployed in a form that covers the front surface of the seat. The first end of the tether wire 300 is fixed to the inner surface of the front chamber 100*b*.

In other words, the front end of the tether wire 300 is fixed in the front chamber 100*b*, and the tether wire 300 is prevented from disturbing the deployment operation of the front chamber 100*b* in the deployment process of the airbag cushion 100.

Therefore, the tether wire 300 is pulled without the risk of deployment malfunctions of the airbag cushion 100, and the operability of the tether wire 300 can be secured.

Furthermore, in the present disclosure, as shown in FIG. 4, a partition wall 110 with a through hole 111 is fixed to the inner surface of the airbag cushion 100; and the tether wire 300 passes through the through hole 111 so that the tether wire 300 may extend rearward.

For example, a plurality of partition walls 110 having a surface form is fixed on the inner surface of the airbag cushion 100 to inflate the side chamber 100*a* and the front chamber 100*b* into desired deployment forms.

A plurality of through holes 111 is formed in the partition wall 110, and gas in the airbag cushion 100 may flow through the through holes 111.

Specifically, in addition to the flow of the gas in the airbag cushion 100, the tether wire 300 passes through the through hole 111, and the through hole 111 may guide a moving path of the tether wire 300.

Thereafter, a sectional area of the through hole 111 is formed to be greater than or at least equal to a sectional area of the tether wire 300 so that the moving operation of the tether wire 300 through the through hole 111 is easily performed.

In addition, in the present disclosure, an insertion hole 120 is formed in the rear end of the airbag cushion 100, and the tether wire 300 comes out the airbag cushion 100 through the insertion hole 120.

In other words, since a middle portion of the tether wire 300 passes through the inner space of the side chamber 100*a*, the middle portion of the tether wire 300 is prevented from disturbing the deployment operation of the side chamber 100*a* in the deployment process of the airbag cushion 100, and the tether wire 300 is unfolded while avoiding the passenger.

Therefore, the tether wire 300 is pulled without the risk of deployment malfunctions of the airbag cushion 100 so that the operability of the tether wire 300 can be secured.

Moreover, the insertion hole 120 may be a hole through which an inflator 400 is inserted into the airbag cushion 100.

In other words, the inflator 400 is a device triggered by a crash signal of a vehicle to explode and produce gas, and the insertion hole 120 is formed close to a portion of the airbag cushion 100 connected to the inflator 400 so that the inflator 400 is inserted through the insertion hole 120.

Therefore, the insertion hole 120 of the inflator 400 is also used as a hole through which the tether wire 300 passes, and a separate hole for the tether wire 300 to be inserted into the airbag cushion 100 is not required. Therefore, work for forming the hole is not required, and the manufacturing hours of the airbag cushion 100 can be reduced.

Furthermore, in the present disclosure, as shown in FIGS. 1 and 2, the second end of the tether wire 300 may be connected to the restraint tether 200 from the direction of the side chamber 100*a*.

In other words, the restraint tether 200 pulls the airbag cushion 100 toward a first rear space of the passenger, and the tether wire 300 connected to the restraint tether 200 pulls the airbag cushion 100 toward a second rear space of the passenger.

Specifically, the tether wire 300 coming out the airbag cushion 100 extends upward along the side chamber 100*a* and, at a height of the restraint tether 200, extends toward the restraint tether 200 to be connected to the restraint tether 200.

In other words, the restraint tether 200 is not only pulled by the seatback located behind the restraint tether 200 at an equal height to the restraint tether 200, but also pulled by the tether wire 300 in an outward direction of the restraint tether 200.

Therefore, when the tether wire 300 is not applied, a single load path of pulling the airbag cushion 100 is only formed in a rear-sideward direction of the seatback. However, when the tether wire 300 is applied as described in the present disclosure, a load path of pulling the airbag cushion 100 is branched toward the side chamber 100*a*, increasing the restraint force of the airbag cushion 100.

Although the specific embodiment of the present disclosure has been provided, it is apparent to one of ordinary skill in the art that the present disclosure may be changed and modified in various ways without departing from the scope of the present disclosure, which is provided in the following claims.

What is claimed is:

1. An airbag device comprising:
   an airbag cushion deployed to cover a side surface and a front surface of a seat;
   a restraint tether configured to be connected to the airbag cushion at a position passing a body part of a passenger between an inner surface of the airbag cushion and a seatback; and
   a tether wire connected from a front portion of the airbag cushion through an outside space of the airbag cushion to the restraint tether so that the restraint tether is pulled in a direction opposite to the passenger by a deployment force of the airbag cushion,
   wherein the tether wire, connected to an inner surface of a front end of the airbag cushion at a first end thereof, extends rearward inside the airbag cushion to exit the airbag cushion, and
   wherein the tether wire is connected to the restraint tether at a second end thereof.

2. The airbag device of claim 1, wherein the tether wire is configured to be connected to a portion of the restraint tether closest to the body part of the passenger.

3. The airbag device of claim 2, wherein the restraint tether is configured to be connected to a position that passes a shoulder part of the passenger, and the tether wire is configured to be connected to a portion of the restraint tether closest to a neck portion of the passenger.

4. The airbag device of claim 1, wherein the airbag cushion comprises:
   a side chamber deployed to cover the side surface of the seat; and
   a front chamber deployed to cover the front surface of the seat, and
   wherein the first end of the tether wire is fixed to an inner surface of the front chamber.

5. The airbag device of claim 4, wherein the second end of the tether wire is connected to the restraint tether from a direction of the side chamber.

6. The airbag device of claim 1, wherein the airbag cushion includes a partition wall having a through hole extending through the inner surface of the front end of the airbag cushion, and
   wherein the tether wire passes through the through hole and then extends rearward.

7. The airbag device of claim 1, wherein an insertion hole is formed at a rear end of the airbag cushion, and
   wherein the tether wire comes out of the airbag cushion through the insertion hole.

8. The airbag device of claim 7, wherein the insertion hole is provided to insert an inflator into the airbag cushion.

9. The airbag device of claim 1, wherein the tether wire coming out of the airbag cushion extends upward along a side chamber and, at a height where the restraint tether is located, extends toward and is connected to the restraint tether.

10. An airbag system for a vehicle, the system comprising:
   an airbag cushion configured to, upon deployment, inflate a left side chamber including a left front portion, and a right side chamber including a right front portion, such that the left side chamber and the right side chamber protect respective sides of a passenger seated on a seat of the vehicle, and the left front portion and the right front portion protect a front of the passenger;
   a restraint tether connected to a seatback of the seat and configured to, upon deployment of the airbag cushion, maintain the left front chamber and the right front chamber in a position to restrain forward movement of the occupant; and
   a tether wire connected to at least one of the left front portion and the right front portion through the airbag cushion to the restraint tether, such that the restraint tether is pulled in a direction opposite to the passenger by a deployment force of the airbag cushion and does not come in contact with the passenger, wherein the tether wire, connected to an inner surface of a front end of the airbag cushion at a first end thereof, extends rearward inside the airbag cushion to exit the airbag cushion, and wherein the tether wire is connected to the restraint tether at a second end thereof.

11. The system of claim 10, wherein the left side chamber and the right side chamber including respective partition walls with through holes extending through inner surfaces of the airbag cushion, and wherein the tether wire passes through the through holes to enable the tether wire to extend rearward.

12. The system of claim 10, wherein the restraint tether includes an upper restraint tether and a lower restraint tether, wherein the upper restraint tether is attached to upper surfaces of the left front chamber and the right front chamber, and wherein the lower restraint tether is attached to lower surfaces of the left front chamber and the right front chamber.

13. The system of claim 10, wherein the tether wire is configured to be connected to a portion of the restraint tether closest to a body part of the passenger.

14. The system of claim 13, wherein the restraint tether is configured to be connected to a position that passes a shoulder part of the passenger, and the tether wire is configured to be connected to a portion of the restraint tether closest to a neck portion of the passenger.

\* \* \* \* \*